United States Patent [19]
Chemelli et al.

[11] 3,974,507
[45] Aug. 10, 1976

[54] CONVERSION OF STRIPE-GEOMETRY JUNCTION LASER EMISSION TO A SPHERICAL WAVEFRONT

[75] Inventors: Robert Guido Chemelli, Morristown; Richard Carrel Miller, Summit, both of N.J.

[73] Assignee: Bell Telephone Laboratories, Incorporated, Murray Hill, N.J.

[22] Filed: Sept. 29, 1975

[21] Appl. No.: 617,531

[52] U.S. Cl. ............................. 346/76 L; 346/108; 331/94.5 D; 178/6.6 B
[51] Int. Cl.² ................... G01D 15/10; G01D 9/42; H01S 3/00; H04N 1/00
[58] Field of Search ........... 346/76 L, 108; 350/190; 331/94.5 D; 178/6.6 B

[56] References Cited
UNITED STATES PATENTS

| | | | |
|---|---|---|---|
| 3,396,344 | 8/1968 | Broom | 331/94.5 C |
| 3,656,175 | 4/1972 | Carlson et al. | 346/76 L |
| 3,736,046 | 5/1973 | Zook | 346/76 L X |
| 3,866,238 | 2/1975 | Monroe | 346/76 L |

OTHER PUBLICATIONS
Watson, Hugh A., "An Experimental Page Facsimile System," Bell Laboratories Record, Mar. 1975, pp. 163–169.

*Primary Examiner*—George H. Miller, Jr.
*Attorney, Agent, or Firm*—L. C. Canepa

[57] ABSTRACT

In a micrographics system of the type in which holes are machined in a thin film by means of a laser (see, for example, reissue U.S. Pat. No. 28,375 of D. Maydan, M. I. Cohen and R. E. Kerwin, granted Mar. 25, 1975), it is advantageous that the laser be a solid-state unit of the stripe-geometry double-heterostructure type. But the optical output beam of such a laser typically exhibits astigmatism and an elliptical cross-section. To assure high-quality machining of the film, it is important that the astigmatic nature of the beam be corrected and, in addition, that the beam be converted to one having a circular cross-section. As described herein, this is accomplished by means of an inexpensive and easily adjustable compact array of optical components that are relatively insensitive to beam-steering and to certain filamentation effects that may occur in the laser.

11 Claims, 9 Drawing Figures

CONVERSION OF STRIPE-GEOMETRY JUNCTION LASER EMISSION TO A SPHERICAL WAVEFRONT

BACKGROUND OF THE INVENTION

This invention relates to laser machining of a thin film to produce miniature images therein and, more particularly, to a lens array for converting the output of the laser to assure reliable and high-quality image formation in the film.

A unique compact facsimile system for transmitting a high-resolution image of a printed page is described in "An Experimental Page Facsimile System" by H. A. Watson, *Bell Laboratories Record*, Mar. 1975, pp. 163–169. The most important advantage of the described system is its speed - 10 seconds for scanning, transmitting and displaying the image of a standard 8 1/2×11-inch page.

The equipment for the described facsimile system consists of three principal parts. At the terminating end is a page-scanning apparatus which generates a video signal representing the original document. Next is a broadband analogue transmission line over which the video signal is transmitted. And finally at the receiving end there is apparatus including a laser for selectively machining a thin film and thereby reassembling an image of the document.

Advantageously, the laser included in the receiver is a gallium arsenide stripe-geometry double-heterostructure device. With such a laser it has been possible to construct a relatively compact and simple receiver for machining a thin film.

A typical gallium arsenide laser provides an optical output beam that exhibits astigmatism and an elliptical cross-section. To assure high-quality machining of the thin film it is important that the astigmatic nature of the beam be corrected and, in addition, that the beam be converted to one having a circular cross-section. Illustrative apparatus for so correcting and converting the laser beam is described in a copending application of R. G. Chemelli, D. D. Cook and R. C. Miller, application Ser. No. 599,850, filed July 28, 1975, assigned to the same assignee as this application.

A gallium arsenide laser sometimes exhibits the phenomena of beam steering and/or filamentation, effects known to workers in the art which can be especially pronounced when the laser is coupled into optical apparatus of the type described in the aforecited copending application of Chemelli, Cook and Miller. These effects can cause degradation of the images formed by gallium arsenide laser machining systems as heretofore constructed.

SUMMARY OF THE INVENTION

Accordingly, an object of the present invention is to improve a laser machining system of the type that includes a gallium arsenide laser.

More specifically, an object of this invention is apparatus that is relatively insensitive to beam steering and to certain kinds of filamentation effects for correcting the astigmatic nature of the output of a gallium arsenide laser and for converting the beam to one having a circular cross-section.

Briefly, these and other objects of the present invention are realized in a specific illustrative embodiment thereof that comprises a lens array interposed between the output face of a solid-state PpnN junction laser and a thin film that is to be selectively laser-beam-machined to form microimages therein. It is characteristic of the PpnN laser that its output beam viewed in a plane normal to the junction plane exhibits a relatively large far-field divergence angle with an apparent source at the output face, whereas viewed in a plane parallel to the junction plane the beam has a relatively small far-field divergence angle with an apparent source in the laser behind the output face.

In a particular illustrative embodiment, the lens array includes a large-numerical-aperture spherical lens positioned to collect light emitted by the laser and to form spaced-apart real images of the apparent sources. Further, the array comprises a hemicylindriclal lens positioned to collect light formed by the spherical lens and to cause light rays directed at the thin film to appear to diverge with azimuthal symmetry from one of the real images.

BRIEF DESCRIPTION OF THE DRAWING

A complete understanding of the present invention and of the above and other objects may be gained from consideration of the following detailed description presented hereinbelow in connection with the accompanying drawing in which:

FIGS. 5 and 6 respectively depict two illustrative embodiments of this invention;

FIGS. 8 and 9 respectively depict two other illustrative embodiments of this invention.

DETAILED DESCRIPTION

Figure 1:
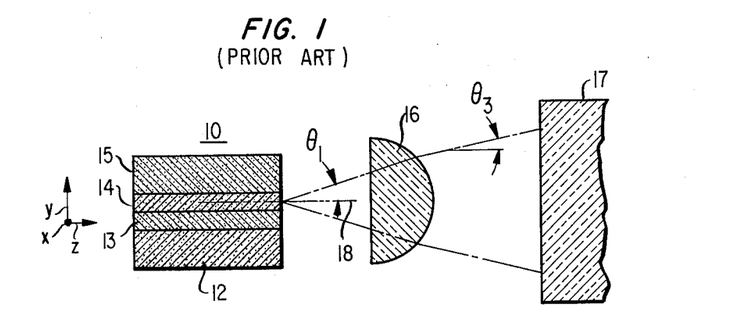
FIGS. 1 and 2 are cross-sectional side and top views, respectively, of a conventional solid-state junction laser combined with prior art lens components.

FIG. 1 shows a cross-sectional side view of an illustrative solid-state junction laser 10 of the type to which the present invention is applicable. By way of example, the laser 10 is a gallium arsenide stripe-geometry double-heterostructure device comprising successive layers of N-type GaAlAs 12, n-type GaAs 13, p-type GaAs 14 and P-type GaAlAs 15 formed on a GaAs substrate (not shown). The lowest-order optical mode of the laser 10 is confined mainly to the p-type GaAs region 14 within a stripe width usually defined by proton bombardment. For lowest-order-mode operation the height (or y-direction dimension) of the layer 14 is typically less than 1.5 microns. (For a more detailed description of this type of laser see *Journal of Applied Physics*, Vol. 44, No. 3, March 1973, pp. 1276–1280.) Illustratively, the stripe width (dimension *a* in FIG. 2) is approximately 12 microns, and the size of the laser 10 is about 380 by 100 by 380 microns in the x, y and z directions, respectively.

Figure 2:
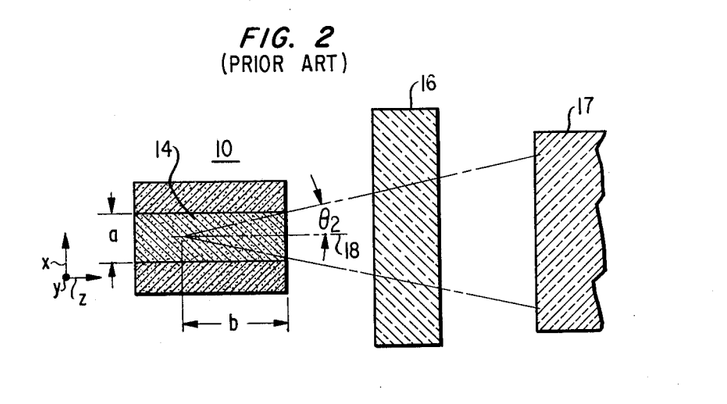

Two basic problems associated with use of a gallium arsenide laser for machining a thin film are the astigmatism and elliptical cross-section of the output beam provided by the device 10. These characteristics are illustrated by dashed-line rays emanating from the laser in a plane perpendicular to the junction plane (FIG. 1) and in a plane parallel to the junction plane (FIG. 2). (The junction plane constitutes the x-z plane shown in FIGS. 1 and 2). Specifically, the laser beam viewed in a plane normal to the junction plane (for the particular GaAs laser assumed herein) typically has a far-field divergence half-angle $\theta_1$ (FIG. 1) of approximately 25°–30° (measured at $1/e^2$ of peak intensity) with an apparent source at the laser output mirror (the right-hand end face of the device 10). The laser beam viewed in a plane parallel to the junction plane has a far-field divergence half-angle $\theta_2$ (FIG. 2) of about 6°–8° with an apparent source at a distance $b$ of approximately 20–50 microns behind the laser output mirror.

The output of the laser 10 can conveniently be described in terms of two spatially separated air-equivalent beam waists. (Herein these waists are not explicitly shown. For ease of presentation all sources and images thereof will be schematically represented as points.) One of these waists, $W_x$, is equal, in order of magnitude, to half the width $a$ shown in FIG. 2 and is responsible for ray divergence parallel to the junction plane. The other beam waist, $W_y$, is equal, approximately, to half the height of the region 14 and is responsible for ray divergence perpendicular to the junction plane. The fact that these waists are spatially separated means that the laser beam is astigmatic. The fact that $W_x$ is typically greater than $W_y$ means that the beam is elliptical in cross-section and that its far-field divergence is more rapid perpendicular to the junction plane than parallel to the junction plane. The astigmatism and ellipticity must be corrected in order to achieve the objective of a spherical wavefront which, as a practical matter, is required for maximum-efficiency laser machining.

In the aforecited copending application of Chemelli, Cook and Miller, optical components are described for converting the elliptical light beam emanating from the laser 10 of FIGS. 1 and 2 into a circular beam and for focusing the light onto a recording medium. Illustrative such components as specified in that application are shown in FIGS. 1 and 2. These components comprise a small hemi-cylindrical lens 16 and a graded-index-of-refraction optical fiber 17.

The hemicylindrical lens 16 is effective to cause the rays included in the fan-shaped light beam of FIG. 1 to be refracted by various amounts toward principal axis 18. In particular the lens 16 is selected to make the angle of divergence $\theta_3$ shown in FIG. 1 approximately equal to the angle of divergence $\theta_2$ shown in FIG. 2. For the fan-shaped light beam represented in FIG. 2 the hemi-cylindrical lens 16 provides no focusing action. The rays constituting the beam of FIG. 2 are, however, refracted by the component 16 and displaced by respective amounts which increase with the angle of ray incidence.

As described in the aforecited application, the result of the operation of the lens 16 of FIGS. 1 and 2 is to convert the laser output to an approximately non-astigmatic circular cross-sectional beam which is useful for machining.

An element such as the hemicylindrical component 16 of FIGS. 1 and 2 that provides a lens action only for the fan-shaped beam in the y-z (or normal-to-the-junction) plane will be referred to herein as a $C_y$ lens. [If the component 16 were rotated 90° about the z axis, it would then be referred to as a $C_x$ lens. In that case it would provide a lens action only for the fan-shaped beam in the x-z (or parallel-to-the-junction) plane].

As mentioned earlier above, a gallium arsenide laser sometimes exhibits beam steering and/or filamentation. Beam steering is represented, for example, by considering that the principal axis 18 of FIG. 2 has tilted upward or downward in the x-z plane to make an angle other than 0° with the z axis. One common type of filamentation (source displacement) is manifested, for example, by movement along the x-axis of the apparent source represented in FIG. 2 as being to the left of the laser output face.

If beam steering or source-displacement filamentation occurs in the arrangement shown in FIGS. 1 and 2, a portion of the output provided by the laser 10 will not be coupled to the fiber 17. If this aperturing effect is sufficiently pronounced, the ability of the laser to machine a thin film in a reliable high-quality manner will be deleteriously affected. This is due to the fact that if the laser energy delivered to the thin film is reduced, a smaller-than-desired hole is machined and, below a certain threshold energy, no hole at all is machined.

Before proceeding to describe specific illustrative embodiments of the present invention that constitute advantageous alternatives to the arrangement comprising elements 16 and 17 of FIGS. 1 and 2, it will be helpful to describe briefly an overall system in which applicants' inventive embodiments may, for example, be included. Such a system is shown in FIG. 3.

The particular facsimile system described in the aforecited Watson article includes an yttrium aluminum garnet (YAG) laser. This laser, however, has certain practical disadvantages, primarily that it requires a water-cooling system and internal and external acoustooptic modulators. By contrast, a GaAs laser is much smaller in size and very much less expensive than a YAG laser and can be modulated merely by varying the forward current passing through the p-n junction of the device. The power supply required for the GaAs laser is also much smaller, and the laser does not require water cooling. Accordingly, the illustrative system of FIG. 3, which may, for example, be used in the areas of facsimile transmission, information retrieval and computer graphics, is depicted as including a GaAs laser 20.

Figure 3:
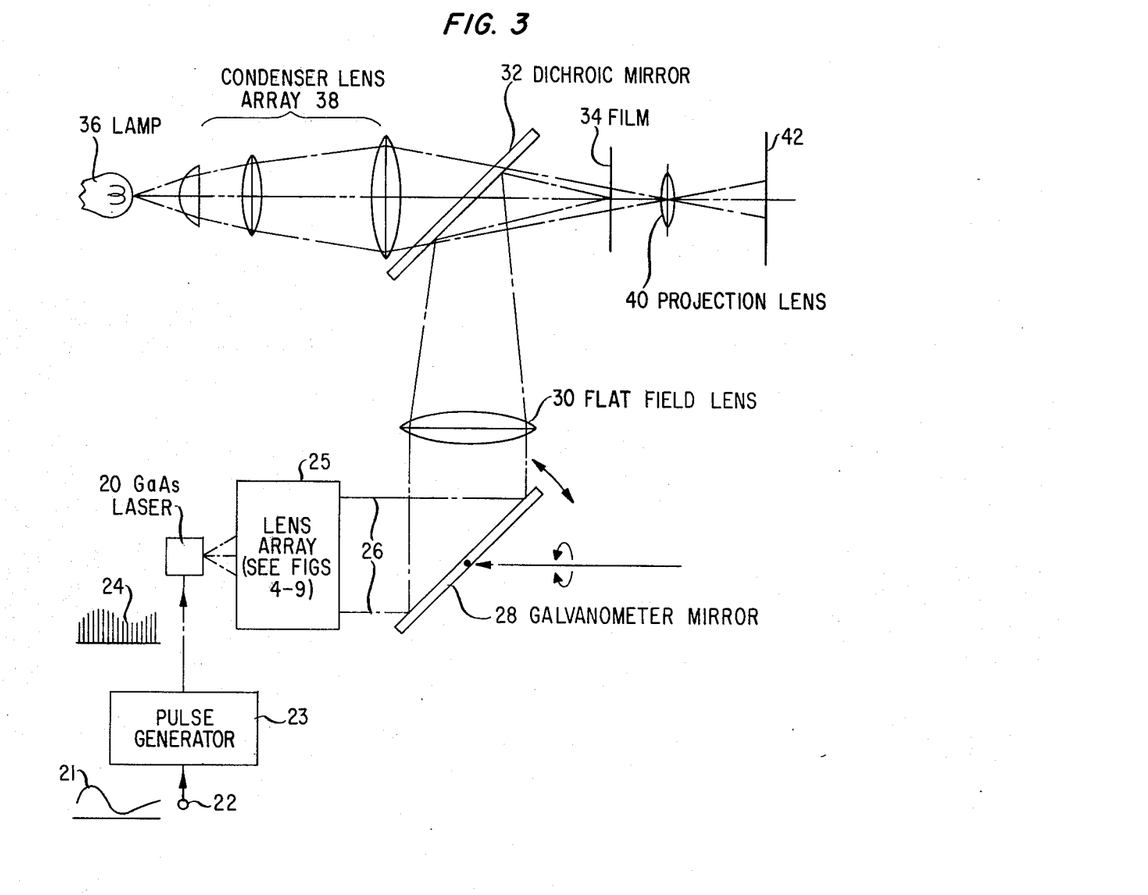
FIG. 3 is a schematic representation of a laser-machining arrangement of the type in which the present invention is illustratively included.

In FIG. 3 a received analog electrical signal 21 is applied to input terminal 22. The signal 21 is assumed to have resulted, for example, from a raster scan of some graphical material. More specifically, the signal 21 is an analog representation of the light and dark areas along successive lines equally spaced from top to bottom of a scanned frame.

A pulse generator 23 responds to the signal 21 by providing a variable-amplitude pulse train 24 representative of the signal 21. In turn, the pulses in the train 24 cause the laser 20 to operate in a pulsed mode of operation. In this mode the laser generates variable-intensity output pulses at a wavelength of 8900 Å each about 100 nanoseconds in duration. During the machining of a line these pulses can occur at repetition rates up to about $2 \times 10^5$ per second.

In accordance with the principles of the present invention, a lens array or system 25 is interposed in the path of the optical pulses generated by the laser 20. Various embodiments of this array are shown in FIGS. 4–9 and will be described in detail later below. The array 25 is relatively insensitive to beam steering and filamentation and serves to convert the output of the laser to an expanded nonastigmatic circular cross-sectional beam. The beam provided by the array 25 is represented and bounded by dashed lines 26.

The collimated beam 26 shown in FIG. 3 is incident upon an electromechanically driven galvanometer mirror 28 which oscillates in a sawtooth manner about an axis normal to the page of the drawing. This causes the beam to be deflected from one side to the other of a frame being machined. After reflection from the mirror 28 the beam 26 is focused by a flat-field lens 30 and directed at a dichroic mirror 32 that is highly reflective to light at 8900 A. In turn, a narrow-waist beam about 5 microns in diameter is directed by the mirror 32 onto the surface of thin film 34.

The galvanometer mirror 28 of FIG. 3 is gimballed about an axis which lies in the plane of the drawing and is slowly rotated about this axis. This causes the laser beam to move slowly from top to bottom of a frame on the film 34. In this way plural spaced-apart lines are successively machined on the film.

Light from a projection lamp 36 is directed by a condenser lens array 38 through the dichroic mirror 32 and onto the thin film 34. In this way an image of the frame being machined on the film 34 is projected via lens 40 onto a screen 42.

Figure 4:
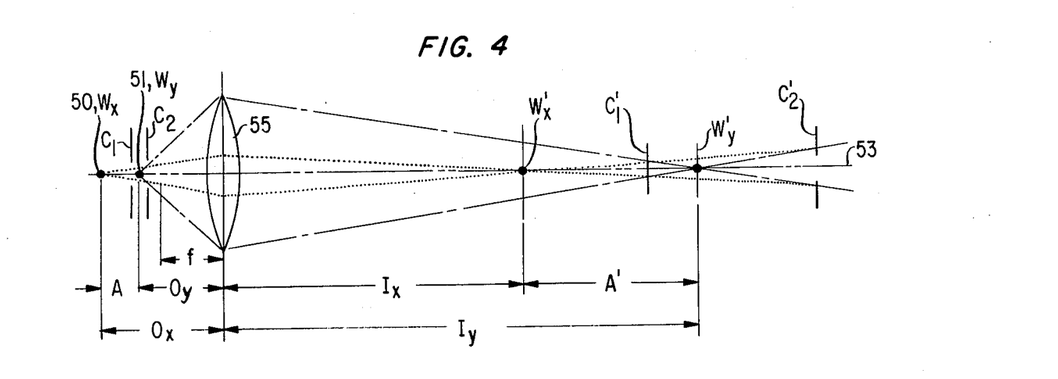
FIG. 4 shows one of the basic lens components included in an array made in accordance with the principles of the present invention.

In FIG. 4 the aforementioned waists $W_x$ and $W_y$ of an optical beam provided by a gallium arsenide laser are represented as points 50 and 51, respectively. Moreover, for ease of presentation, the optical rays emanating from the two waists are shown in a single two-dimensional depiction. $C_1$ and $C_2$ in FIG. 4 indicate those positions along principal axis 53 at which the beam cross-section is circular. $C_1$ is inside the laser and $C_2$ is typically 5–20 microns to the right of the laser output mirror. $O_x$ and $O_y$ are the respective distances of the waists or objects $W_x$ and $W_y$ from the center of lens 55, and A represents the near-field astigmatism of the beam.

In accordance with the principles of the present invention, a large-numerical-aperture spherical lens 55 having a focal length $f$ is interposed in the path of the beam emanating from the waists $W_x$ and $W_y$ of FIG. 4. More specifically, the lens 55 is a well-corrected element whose numerical aperture is sufficiently large to accommodate the aforedescribed divergence of the laser beam plus additional angular deviations caused by beam steering. A single spherical lens may serve as the element 55. But, advantageously, a well-corrected microscope objective that actually comprises plural lens members whose overall effect is comparable to that of a single spherical lens may be used as the element 55. Illustratively, a conventional x43 microscope objective having a numerical aperture of 0.65 and comprising one or several series-disposed aplanats followed by one or more spherical doublets constitutes the element 55. Importantly, the lens 55 is effective to demagnify substantially the divergence angles of the beams directed thereat.

In accordance with the present invention, the lens 55 of FIG. 4 forms images $W'_x$ and $W'_y$ of $W_x$ and $W_y$ at distances $I_x$ and $I_y$, respectively, from the center of the lens 55. The positions of beam cross-sectional circularity corresponding to $C_1$ and $C_2$ are now at $C'_1$ and $C'_2$. In terms of the focal length $f$ of the spherical lens 55 and the object distances $O_x$ and $O_y$, the image field astigmatism $A'$ becomes $A' \equiv (I_y - I_x) = (I_x I_y / O_x O_y) A \equiv (M_x M_y) A$. Illustratively, the linear magnification $M_y$ is about 43 and the linear magnification $M_x$ is about 30, so that $A'$ approximates 1300A. A representative range of A values is 40 to 50 microns. Hence $A'$ is about 50 to 65mm, values that can be corrected by conventional easily manufactured hemicylindrical lenses.

In accordance with one aspect of the principles of the present invention, a simple single-element hemicylindrical lens 57 of the $C_x$ type (see FIG. 5) is interposed in the path of light rays formed by the spherical lens 55. In particular, the lens 57 is centrally located on axis 53 at the aforementioned position of beam circularity designated $C'_1$. The lens 57 is designed to form a real image of $W'_x$ at $W'_y$. Accordingly, all light rays to the right of $W'_y$ appear approximately to diverge from $W'_y$ with azimuthal symmetry. In other words, each of the light rays emanating from $W'_y$ and extending to the right in FIG. 5 appears to form approximately the same angle with the axis 53. Hence the spherical wavefront that diverges from $W'_y$ may be expanded and collimated by conventional components to form a circular cross-sectional beam of the type represented by reference numeral 26 in FIG. 3.

Figure 5:
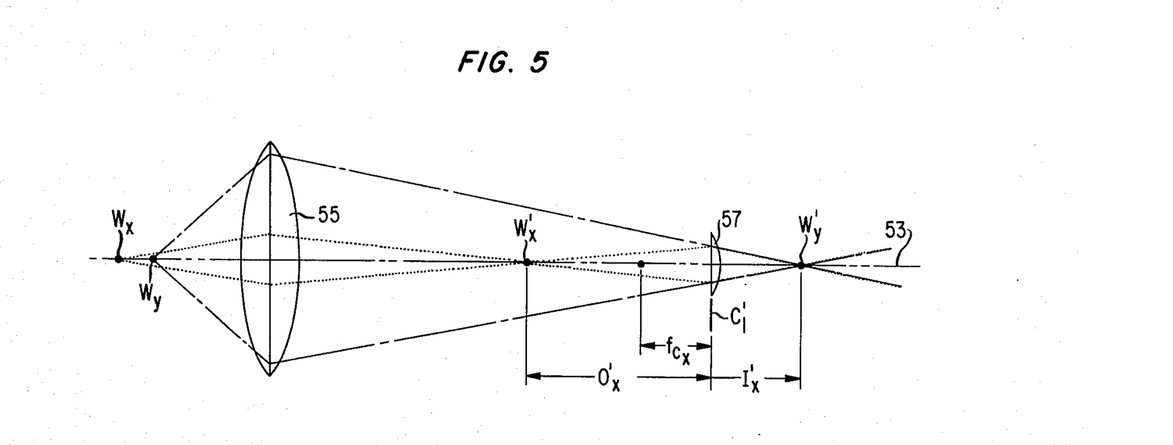

In a specific illustrative embodiment of the arrangement shown in FIG. 5 the distances $O'_x$ and $I'_x$ are 40mm and 20mm, respectively. In that case the focal length $f_C$ of the $C_x$ lens 57 is about 13mm.

Figure 6:
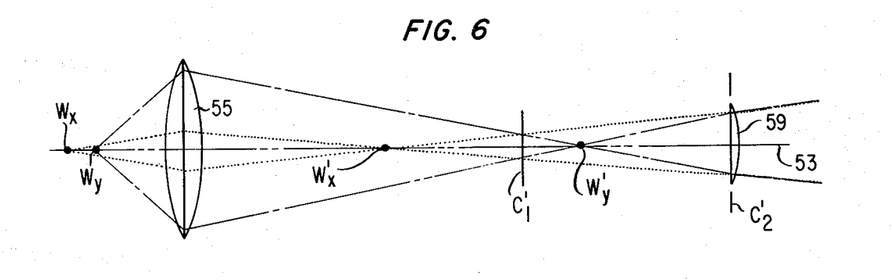

Another specific illustrative embodiment of the principles of the present invention is shown in FIG. 6. In that embodiment a simple single-element hemicylindrical lens 59 of the $C_y$ type is centrally located on principal axis 53 in the path of light rays formed by the spherical lens 55. In particular, the lens 59 is located at the aforementioned position of beam circularity designated $C'_2$. The lens 59 is selected to form a virtual image of $W'_y$ at $W'_x$. Accordingly, a spherical wavefront is thereby formed since all rays to the right of the lens 59 appear approximately to diverge from $W'_x$ with azimuthal symmetry.

In a specific illustrative embodiment of the arrangement represented in FIG. 6, the distance between $W'_x$ and $W'_y$ is 60mm, and that between $W'_x$ and $C'_2$ is 100mm. In that case the focal length of the $C_y$ lens 59 is about 70mm.

Since the beam cross-sections are typically less than 1mm in diameter at $C'_1$ (FIG. 5) and $C'_2$ (FIG. 6), it is apparent that the lenses 57 and 59 can be very weak (i.e., large F-number) elements. Typically, the $C_y$ lens 59 can be weaker than the $C_x$ lens 57. Hence the lens 59 is characterized by a larger F-number and more aberration-free performance and is therefore generally preferred in some applications of practical importance. Most importantly, displacements (in the $x$ direction) of waist $W'_x$, arising from source-displacement filamentation, produce no aberrations when the $C_y$ lens 59 (FIG. 6) is used, since that lens has zero power in the $x$ direction. This feature is absent for the $C_x$ lens 57 (FIG. 5), and leads, therefore, to a preference generally for embodiments which employ only $C_y$ lenses. However, the embodiment of FIG. 5 has shorter optical path lengths than that of FIG. 6, a fact sometimes of practical importance which can lead to selection of the FIG. 5 embodiment even though it remains sensitive to source-displacement filamentation.

In an actual system of the type represented in FIG. 3, it has been found that essentially diffraction-limited performance can be obtained from the single-element hemicylindrical lens 59 located at $C'_2$ (FIG. 6).

As mentioned earlier above, the spherical lens 55 demagnifies the beam divergence angles. As a result, any angular deviations of the laser beam from the axis 53 arising from steering effects is demagnified. More specifically, in particular embodiments of the present invention, steering or angular deviation of the original laser beam by 10° is reduced to about ½° by the spherical lens 55. As a practical matter, the angular aperture of the lenses 57 (FIG. 5) and 59 (FIG. 6) is typically sufficiently large to easily accommodate such a relatively small deviation, and, additionally, the lens 59 can accommodate source displacements in the plane of the junction without causing aberrations. A similar insensitivity to small angular and translational beam shifts can easily be designed into the additional optical components interposed between the lenses 57 and 59 and the thin film 34 (FIG. 3). For this reason the herein-depicted arrangements have been found to be relatively insensitive to beam steering and for the FIG. 6 arrangement, also insensitive to source-displacement filamentation effects.

Figure 7:
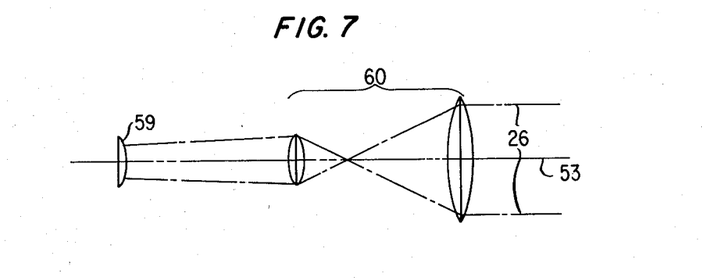
FIG. 7 shows one of the lens components included in an illustrative embodiment of the present invention combined with a conventional beam expander and collimator.

The spherical wavefronts formed by the arrangements shown in FIGS. 5 and 6 are applied to conventional optical components which expand and collimate the beam. By way of example, FIG. 7 shows the optical output of the lens 59 of FIG. 6 being applied to a conventional beam expander and collimator 60. In FIG. 7 output optical rays 26 represent a collimated beam having a circular cross-section. The rays 26 correspond to the identically numbered rays emanating from the array 25 of FIG. 3. It is understood that these expander-collimator components must be designed to be diffraction limited over small, but finite, angular fields.

In accordance with the principles of the present invention, it is possible to construct a variety of alternatives to the specific illustrative embodiments shown in FIGS. 5 and 6. These alternatives include, for example, pairs of hemicylindrical lenses, or a combination of one spherical and one hemicylindrical lens, to avoid or minimize spherical aberration. Two such particular alternatives are respectively shown in FIGS. 8 and 9.

Figure 8:
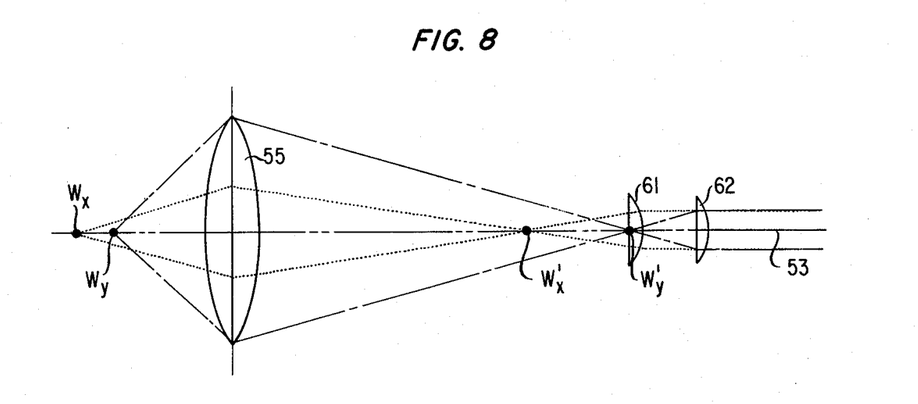

In FIG. 8 a hemicylindrical lens 61 of the $C_x$ type is positioned at $W'_y$ and a hemicylindrical lens 62 of the $C_y$ type is located to the right of the element 61 at a position of beam cross-sectional circularity.

Figure 9:
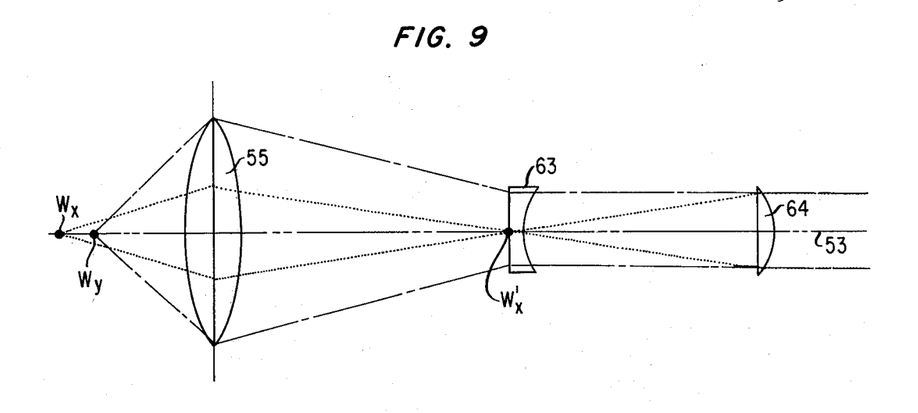

In FIG. 9 a diverging hemicylindrical lens 63 of the $C_y$ type is positioned at $W'_x$ and a hemicylindrical lens 64 of the $C_x$ type is located to the right of the element 63 at a position of beam cross-sectional circularity.

Finally it is to be understood that the above-described arrangements are only illustrative of the application of the principles of the present invention. In accordance with those principles, numerous modifications thereof may be devised by those skilled in the art without departing from the spirit and scope of the invention.

What is claimed is:

1. In combination in a compact micrographics system in which holes are machined in a thin film by means of a solid-state junction laser, a lens array adapted to be interposed between the output face of the laser and the thin film, the output beam of said laser viewed in a plane normal to the junction plane having a relatively large far-field divergence angle with an apparent source at said output face and the output beam of said laser viewed in a plane parallel to the junction plane having a relatively small far-field divergence angle with an apparent source in the laser behind said output face, said array comprising a spherical lens positioned to collect light emitted by said laser and to form spaced-apart real images of said sources, said lens having a numerical aperture sufficiently large to accommodate the maximum divergence exhibited by the output beam of said laser and to accommodate beam steering effects exhibited by said beam, and lens means for collecting light formed by said spherical lens to cause light rays directed at said thin film to form a collimated beam having a circular cross-section.

2. A combination as in claim 1 wherein the beam provided by said laser exhibits two spaced-apart positions of beam cross-sectional circularity before the beam impinges upon said spherical lens, one of said positions, $C_1$, being located in the laser and the other of said positions, $C_2$, being located between the output face of said laser and said spherical lens, wherein the beam formed by said spherical lens exhibits two spaced-apart positions of beam cross-sectional circularity, $C'_1$ and $C'_2$, that correspond respectively to $C_1$ and $C_2$, wherein said spaced-apart images are designated $W'_x$ and $W'_y$, $W'_x$ being closer to said spherical lens than is $W'_y$, wherein $C'_1$ is between $W'_x$ and $W'_y$, and wherein $C'_2$ is farther removed from said spherical lens than is $W'_y$, wherein said lens means comprises a hemi-cylindrical lens positioned at one of said positions $C'_1$, $C'_2$, $W'_x$ and $W'_y$.

3. A combination as in claim 2 wherein said hemicylindrical lens is of the converging type and is positioned at $W'_y$ to collimate the diverging light rays emanating from $W'_x$, and wherein said lens means includes a second hemicylindrical lens of the converging type positioned on the thin-film side of said first-mentioned hemicylindrical lens at a position of beam cross-sectional circularity of collimate the diverging light rays emanating from $W'_y$.

4. A combination as in claim 2 wherein said hemicylindrical lens is of the diverging type and is positioned at $W'_x$ to collimate the converging light rays directed at $W'_y$, and wherein said lens means includes a hemicylindrical lens of the converging type positioned on the thin-film side of said diverging hemicylindrical lens at a position of beam cross-sectional circularity to collimate the diverging light rays emanating from $W'_x$.

5. A combination as in claim 2 wherein said hemicylindrical lens is of the converging type and is positioned at $C'_1$ to form a real image of $W'_x$ at $W'_y$ so that all light rays on the thin-film side of $W'_y$ appear to diverge from $W'_y$ with azimuthal symmetry.

6. a combination as in claim 5 wherein said lens means further includes a beam expander and collimator positioned in the path of light rays diverging from $W'_y$.

7. A combination as in claim 2 wherein said hemicylindrical lens is of the converging type and is positioned at $C'_2$ to form a virtual image of $W'_y$ at $W'_x$ so that all light rays on the thin-film side of said hemicylindrical lens appear to diverge from $W'_x$ with azimuthal symmetry.

8. A combination as in claim 7 wherein said lens means further includes a beam expander and collimator positioned in the path of light rays diverging from said hemicylindrical lens.

9. A lens array adapted to be interposed between the output face of a solid-state junction laser and a thin film that is to be selectively laser-beam machined, the output beam of said laser viewed in a plane normal to the junction plane having a relatively large far-field divergence angle with an apparent source at said output face and the output beam of said laser viewed in a plane parallel to the junction plane having a relatively small far-field divergence angle with an apparent source in the laser behind said output face, said array comprising a spherical lens positioned to collect light emitted by said laser and to form spaced-apart real images of said sources, said lens having a numerical aperture sufficiently large to accommodate the maximum divergence exhibited by the output beam of said laser and to accommodate beam steering effects exhibited by said beam, and lens means positioned to collect light formed by said spherical lens and to cause light rays directed at said thin film to appear to diverge with azimuthal symmetry from one of said real images.

10. An array as in claim 9 further including means interposed in the path of said diverging rays for collimating said rays and forming a beam having a circular cross-section.

11. An array as in claim 10 wherein said lens means positioned to collect light formed by said spherical lens comprises a hemicylindrical lens of the converging type positioned at a position of beam cross-sectional circularity.

* * * * *

UNITED STATES PATENT AND TRADEMARK OFFICE
CERTIFICATE OF CORRECTION

PATENT NO. : 3,974,507
DATED : August 10, 1976
INVENTOR(S) : Robert G. Chemelli and Richard C. Miller It is certified that error appears in the above–identified patent and that said Letters Patent are hereby corrected as shown below:

Column 2, line 14, "hemicylindriclal" should read --hemicylindrical--.

Column 6, line 25, "$f_c$" should read --$f_{c_x}$--. Column 8, line 23, after "$W'_x$ and" insert --$W'_y$,--; line 37, "of" should read --to--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*